Jan. 12, 1937. A. W. BREYFOGEL Re. 20,236
PRINTING TELEGRAPH SYSTEM
Original Filed Dec. 30, 1930
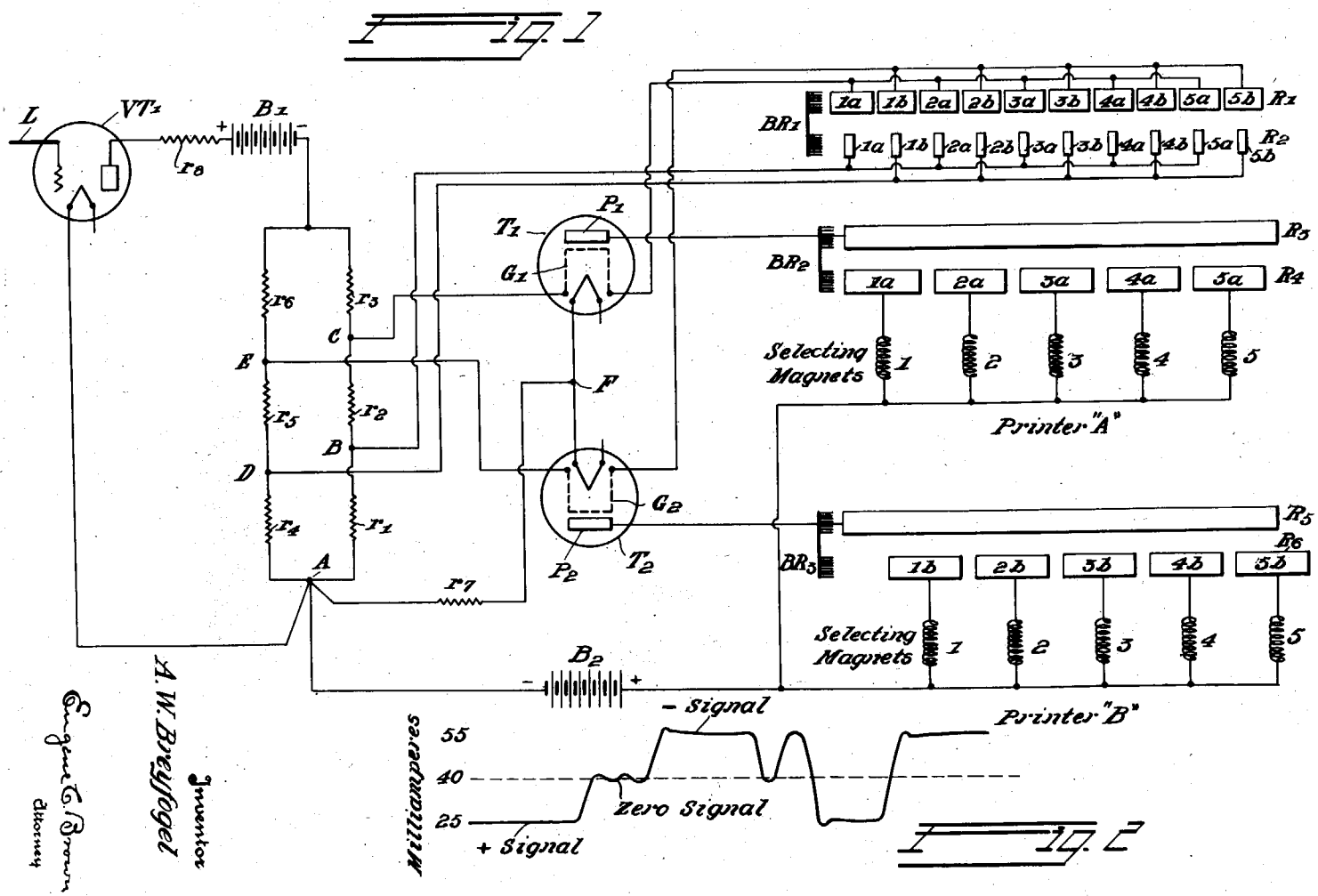

Reissued Jan. 12, 1937

Re. 20,236

UNITED STATES PATENT OFFICE 20,236

PRINTING TELEGRAPH SYSTEM

Albert W. Breyfogel, Howard Beach, N. Y., assignor to The Western Union Telegraph Company, New York, N. Y., a corporation of New York Original No. 1,928,478, dated September 26, 1933, Serial No. 505,609, December 30, 1930. Renewed December 3, 1932. Application for reissue December 31, 1935, Serial No. 57,054

19 Claims. (Cl. 178—52)

This invention relates to a printing telegraph system, and in particular to a telegraph system in which thyratron or other grid-controlled, gas-filled thermionic tubes are employed as relays for operating the magnets of telegraph printers in accordance with incoming signals.

An object of my invention is to devise a grid-controlled, gas-filled tube system for telegraph printers in which there are no stabilizing batteries, and in which the necessary operating potentials are supplied directly from potential drops across resistances connected in the plate circuit of the amplifier controlling these grid-controlled, gas-filled tubes.

Another object of my invention is to devise such a relay circuit in which the grid elements of the tubes are maintained at definite potentials with respect to the cathode elements at all times and are never left free or floating.

A further object of my invention is to devise a grid-controlled, gas-filled tube circuit for the operation of one or more telegraph printers in which upon the receipt of successive positive signal impulses the magnets of two printers are operated alternately, and during no signal impulse periods the magnets of only one printer are operated depending upon which printer was last operated by positive impulses, and negative signal impulses are ineffective to operate either printer.

This invention is an improvement upon the relay circuit disclosed in Figure 2 of the copending application of H. H. Haglund, Serial No. 343,109, patented March 14, 1933, No. 1,901,296.

My invention is illustrated in the accompanying drawing in which:

Figure 1 is a circuit diagram of the novel relay circuit of this invention; and

Figure 2 is a curve representing current variations in the plate circuit of the amplifier controlling the thyratron relays.

Referring to Figure 1, the general arrangement of the invention comprises a vacuum tube relay $VT_1$ having its input connected to an incoming line L, and its output circuit controlling the input circuits of two relays $T_1$ and $T_2$. Relay $T_1$ controls the printer magnets of printer "A" through circuits completed by brushes $BR_1$ associated with pick-up rings $R_1$ and $R_2$, and by brushes $BR_2$ associated with plate rings $R_3$ and $R_4$. Relay $T_2$ controls the magnets of printer "B" through circuits completed by brushes $BR_1$ associated with pick-up rings $R_1$ and $R_2$, and by brushes $BR_3$ associated with plate rings $R_5$ and $R_6$.

The relay circuit may be described in more detail as follows:

In the power or output stage of the vacuum tube amplifier $VT_1$ is a network of resistances $r_1$, $r_2$, $r_3$, $r_4$, $r_5$ and $r_6$. These resistances are proportioned so that $r_1$ is equal to $r_4$, $r_2$ to $r_5$, and $r_3$ to $r_6$, thus forming a parallel circuit as shown. The point A of this resistance network is connected at point F to the cathodes of the two tubes $T_1$ and $T_2$ through a resistance $r_7$. Point B is connected to the (*a*) segments of pick-up ring $R_2$ and point D is connected to the (*b*) segments of pick-up ring $R_2$. Point C is connected to the grid $G_1$ of tube $T_1$ and to the (*a*) segments of pick-up ring $R_1$. Point E is connected to the grid $G_2$ of tube $T_2$ and to the (*b*) segments of pick-up ring $R_1$. The plate $P_1$ of tube $T_1$ is connected to the solid plate ring $R_3$ and the plate $P_2$ of tube $T_2$ is connected to the solid plate ring $R_5$. The segments of plate rings $R_4$ and $R_6$ are connected through the selecting magnets of the "A" and "B" printers to plus battery $B_2$ as shown. The negative side of the battery is connected to the point A.

In order that the operation of the circuit may be made perfectly clear, it might be well to assume certain resistance and circuit values in some of the circuits. Assume the resistances $r_1$, $r_2$, $r_4$ and $r_5$ to be 200 ohms each, $r_3$ and $r_6$ to be 2000 ohms each and $r_7$ equal to 7.5 ohms. Let it further be assumed that for a given anode potential the thyratron tubes $T_1$ and $T_2$ will not start when the voltage on the grid is minus 4.5 volts or more with respect to the cathode but that they will start when the voltage on the grid is minus 4 volts or less with respect to the cathode. This voltage is very will defined for thyratron tubes with a given anode potential.

Let it also be assumed that the current in the power or output stage of the vacuum tube amplifier $VT_1$, varies between 25 and 55 milliamperes as shown in Fig. 2.

As is well known to engineers "the polarity of the impulses is reversed by each stage of the amplifier" (see Patent No. 1,347,049), or, as stated by H. J. Van der Bijl on page 259 of his book entitled, "Thermionic Vacuum Tube," published by McGraw-Hill Book Company, New York, "The space currents in successive tubes are therefore 180° out of phase." Thus, in a four-stage amplifier, if the polarity of the signal impressed upon the grid of the first stage of the amplifier is positive, the signal impressed upon the grid of the second stage will be negative, the signal impressed upon the grid of the third stage will be positive and the signal impressed upon the grid of the fourth stage will be negative.

Accordingly, in the present case it is assumed that the polarity of the signal impressed upon the grid of the fourth or output stage of the amplifier is negative when the polarity of the received signal is positive and vice versa. Hence, in the assumed arrangement, when the polarity of the incoming signal is plus, the current is 25 milliamperes; when the signal is zero, the current is 40 milliamperes; and when the signal is minus the current is 55 milliamperes.

Suppose the polarity of the incoming signal is plus and the current in the plate circuit of the vacuum tube amplifier is 25 milliamperes. This current will divide equally between the two branches of the resistance network, 12.5 milliamperes flowing through the resistances $r_4$, $r_5$ and $r_6$. These currents produce a potential drop of 2.5 volts across each of the resistances $r_1$ and $r_2$ and $r_4$ and $r_5$. The potential at the point A will be plus 2.5 volts with respect to the potential at the points B and D and plus 5 volts with respect to the potential at the points C and E. Also the potential at the grids of the two tubes $T_1$ and $T_2$ is minus 5 volts with respect to the point A and the cathodes since the grids of the two tubes $T_1$ and $T_2$ are connected respectively to the points C and E. This voltage is sufficiently high to prevent either of the tubes $T_1$ and $T_2$ from starting according to the previous suppositions. The pick-up brushes $BR_1$ now make contact with the 1*a* segments of rings $R_1$ and $R_2$, and the plate brushes $BR_2$ make contact with the 1*a* segments of rings $R_3$ and $R_4$. Plus battery is placed on the plate $P_1$ of tube $T_1$ through ring $R_3$, brushes $BR_2$, segment 1*a* of ring $R_4$, and No. 1 selecting magnet of the "A" printer. The brushes $BR_1$ momentarily short-circuit the resistance $r_2$ thus causing the potential at the grid $G_1$ of tube $T_1$ to be reduced from 5 to 3.5 volts and tube $T_1$ starts. Now 200 milliamperes of current flows from plus battery through No. 1 selecting magnet of the "A" printer, through segment 1*a* of ring $R_4$, brushes $BR_2$, ring $R_3$, through plate $P_1$ to cathode of tube $T_1$, through resistance $R_7$ to minus battery. No. 1 selecting magnet of the "A" printer is operated, and the 200 milliamperes flowing in this circuit produces a voltage drop of 1.5 volts across the resistance $r_7$. This voltage drop is in the same direction as the voltage drop across the resistance $r_1$ and raises the voltage at the point B to minus 4 volts with respect to the cathode.

The pick-up brushes $BR_1$ now pass onto the $1_b$ segments of rings $R_1$ and $R_2$, and the brushes $BR_3$ pass onto the $1_b$ segments of ring $R_6$. The brushes $BR_1$ short-circuit the resistance $r_5$ causing the voltage at the grid $G_2$ of tube $T_2$ to fall from 6.5 volts to −4 volts and tube $T_2$ starts. Current will now flow from plus battery through No. 1 selecting magnet of the "B" printer, through segment $1_b$ of ring $R_6$, brushes $BR_3$, ring $R_5$, through the plate $P_1$ to cathode of tube $T_2$, through resistance $r_7$ to minus battery. No. 1 selecting magnet of the "B" printer will be operated, and 400 milliamperes will flow through the resistance $r_7$, producing a voltage drop of 3 volts, which adds to the voltage drop across resistance $r_4$ and raises the voltage at the point D to minus 5.5 volts. But, as tube $T_2$ has already been started, it cannot be again influenced by the grid until the arc has been stopped by removing the anode potential. Tube $T_2$ then continues to pass current.

The plate brushes $BR_2$ now pass off the segment 1*a* of ring $R_4$, removing the anode potential from the plate $P_1$ of tube $T_1$, thus causing the arc to stop and tube $T_1$ ceases to function. This reduces the current through resistance $r_7$ to 200 milliamperes and reduces the voltage drop across this resistance $r_7$ to 1.5 volts. As the brushes $BR_1$ now pass onto the 2*a* segments of rings $R_1$ and $R_2$, and the brushes $BR_2$ pass onto the 2*a* segments of rings $R_3$ and $R_4$, the resistance $r_2$ is again short-circuited and the voltage at the grid $G_1$ of tube $T_1$ is reduced from −6.5 volts to −4 volts and tube $T_1$ again starts.

This cycle of events will continue so long as the incoming signal is plus and the plate current of the vacuum tube $VT_1$ is 25 milliamperes, i. e. each tube $T_1$ and $T_2$ will start when the pick-up brushes $BR_1$ come in contact with the corresponding pick-up segments.

Suppose that the voltage of the incoming signal falls to zero as illustrated in Fig. 2 and that the current in the plate circuit of the vacuum tube $VT_1$ rises to 40 milliamperes. Also suppose that the tube $T_2$ is operating and the brush $BR_3$ is still making contact with the plate segment $5_b$.

When the pick-up brushes $BR_1$ move onto the 1*a* segments of rings $R_1$ and $R_2$, the resistance $r_2$ is again short-circuited but the voltage applied to the grid $G_1$ of tube $T_1$ is now minus 5.5 volts with respect to the cathode and tube $T_1$ does not start. When the current in the plate circuit of the tube $VT_1$ increased to 40 milliamperes, the drop across the resistance $r_1$ increased from 2.5 to 4 volts and since tube $T_2$ is still operating, the voltage drop of 1.5 volts across the resistance $r_7$ is aiding the voltage drop across the resistance $r_1$ making the voltage on the grid $G_1$ of tube $T_1$ minus 5.5 volts with respect to the cathode. The brushes $BR_3$ now pass off the segment $5_b$ of ring $R_6$ removing the anode potential from the plate $P_2$ of tube $T_2$, thus causing the arc to stop and tube $T_2$ ceases to function. The voltage drop across the resistance $r_7$ now falls to zero. The pick-up brushes $BR_1$ now move onto the $1_b$ segments of rings $R_1$ and $R_2$ and the plate brushes $BR_3$ move onto the $1_b$ segment of ring $R_6$. The resistance $r_5$ is short-circuited by the brushes $BR_1$ thus causing the voltage at the grid $G_2$ of tube $T_2$ to fall from minus 8 to minus 4 volts, and tube $T_2$ again starts.

This cycle of events will continue so long as the potential of the incoming signal remains zero and the plate current of the vacuum tube $VT_1$ is 40 milliamperes. That is, the relay tube which was last operated by a plus signal will alone continue to operate after the signal voltage has fallen to zero. The other tube will never operate so long as this condition continues.

Now suppose the incoming signal becomes minus and the current in the plate circuit of the vacuum tube $VT_1$ rises to 55 milliamperes. This increase in current will produce an increased voltage drop across the resistances $r_1$, $r_2$, $r_4$ and $r_5$. The voltage drop across each of these resistances will be 5.5 volts. Also suppose that the tube $T_2$ is operating and the brush $BR_3$ is still making contact with the plate segment $5_b$.

When the pick-up brushes $BR_1$ move onto the 1*a* segments of rings $R_1$ and $R_2$, the resistance $r_2$ is again short-circuited, and the voltage applied to the grid $G_1$ of tube $T_1$ becomes minus 7 volts with respect to the cathode, and tube $T_1$ cannot start. When the current in the plate circuit of the tube $VT_1$ increases to 55 milliamperes, the voltage drop across resistance $r_1$ increased from 4 volts to 5.5 volts, and since the tube $T_2$ is still operating, the voltage drop of 1.5 volts across the resistance $r_7$ is aiding the voltage drop across the resistance $r_1$, making the voltage on the grid $G_1$ of tube $T_1$ minus 7 volts with respect to the cathode. The brushes $BR_3$ now pass off the segment $5_b$ removing the anode potential from the plate $P_2$ of tube $T_2$ thus causing the arc to stop, and tube $T_2$ ceases to function. The voltage drop across the resistance $r_7$ now falls to zero. The pick-up brushes $BR_1$ now move onto the $1_b$ segments of rings $R_1$ and $R_2$ and the plate brushes move onto the $1_b$ segment of ring $R_6$. The resistance $r_5$ is short-circuited by the brushes $BR_1$, this causing the voltage at the grid $G_2$ of $T_2$ to fall from minus 11 voltage to minus 5.5 volts. This voltage is above that necessary to permit the tube to start and tube $T_2$ therefore, does not start.

This cycle of events will continue so long as the incoming signal is minus in polarity and the plate current of the tube $VT_1$ is 55 milliamperes. That is, neither relay tube is operated when the incoming signal is minus.

From the foregoing it is seen that when the incoming signal is plus, each tube will start when the pick-up brushes $BR_1$ pass onto their associated pick-up segments, and when the incoming signal is minus, neither tube will start. Also, when the incoming signal falls to zero, one tube will start every time the pick-up segments associated with it are short-circuited by the pick-up brushes $BR_1$. Which tube will start depends upon the position of the brushes and whether the incoming signal falls from plus to zero or rises from minus to zero.

From the foregoing description of the operation of the circuit, it will be seen that the grids of the two relay tubes never go plus, and that starting of the tubes is accomplished by reducing the negative bias to such a negative value as will permit starting. This makes the relay tubes more stable for the reason that if the grid goes positive, it draws current and in doing so builds up a charge which changes the grid potential needed to make the tube start.

It will also be noticed that all biasing or stabilizing batteries have been eliminated and that the grids of the relay tubes are kept at their proper potentials by the voltage drops in the signaling circuit itself. Furthermore, the grids of the two relay tubes are never disconnected from the signaling circuit and are never left free to be affected by extraneous pick-up or disturbances.

I claim:

1. In a signaling system, a signaling circuit, a grid-controlled, gas-filled tube having its input circuit connected to said signaling circuit, means for normally maintaining the grid of said tube negative with respect to its cathode, and additional means responsive to positive signal impulses to reduce said negative biasing potential while maintaining its polarity the same.

2. In a signaling system, a signaling circuit, a grid-controlled, gas-filled tube having its input circuit connected to said signaling circuit, means for normally maintaining the grid of said tube negative with respect to its cathode, and additional means responsive to negative signal impulses to increase said negative potential.

3. In a signaling system, a signaling circuit, a grid-controlled, gas-filled tube having its input circuit connected to said signaling circuit, means for normally maintaining the grid of said tube negative with respect to its cathode, and means operable in synchronism with incoming signals for reducing said negative biasing potential during a positive signal period and during no-signal period while maintaining the biasing potential negative.

4. In a signaling system, a signaling circuit, a grid-controlled, gas-filled tube having its input circuit connected to said signaling circuit, means for normally maintaining the grid of said tube negative with respect to its cathode, and means responsive to signal impulses to decrease said negative biasing potential for positive signals and increase said potential for negative signals while maintaining the polarity unchanged, and means operable in synchronism with said impulses for further reducing said negative biasing potential during positive and no signal periods.

5. In a signaling system, a signaling circuit including a resistance, a grid-controlled, gas-filled tube having its input circuit connected across said resistance, means for establishing a direct current through said resistance to normally maintain the grid of said tube negative with respect to its cathode, and additional means for decreasing said biasing current upon the receipt of positive signals and increasing said biasing current upon receipt of negative signals.

6. In a signaling system, a signaling circuit including a resistance, a grid-controlled, gas-filled tube having its input circuit connected across said resistance, means for establishing a direct current through said resistance to normally maintain the grid of said tube negative with respect to its cathode, means for decreasing said biasing current upon the receipt of positive signals and increasing said biasing current upon receipt of negative signals, and means operable in synchronism with said signals for periodically reducing said negative biasing potential.

7. In a signaling system, a signaling circuit terminated with a vacuum tube amplifier, a source of current and a resistance in the output stage of said amplifier, a grid-controlled, gas-filled tube having its input circuit connected across at least a portion of said resistance whereby the plate current of said amplifier normally maintains the grid of said gas-filled tube negative with respect to its cathode, said vacuum tube amplifier being so connected to said signaling circuit that positive signals produce a decrease in the current through said resistance, and negative signals produce an increase in said current.

8. In a signaling system, a signaling circuit terminated with a vacuum tube amplifier, a source of current and a resistance in the output stage of said amplifier, a grid-controlled, gas-filled tube having its input circuit connected across at least a portion of said resistance whereby the plate current of said amplifier normally maintains the grid of said gas-filled tube negative with respect to its cathode, said vacuum tube amplifier being so connected to said signaling circuit that positive signals produce a decrease in the current through said resistance, and negative signals produce an increase in said current, and means operable in synchronism with incoming signals for periodically short-circuiting a portion of the resistance included in the input circuit of said gas-filled tube.

9. In a signaling system, a signaling circuit terminated with a vacuum tube amplifier having a divided output circuit, a resistance in each branch of said output circuit through which a portion of the plate current flows, a grid-controlled, gas-filled tube associated with each branch of said output circuit and having its input circuit connected across at least a portion of said resistance, whereby the plate current of said amplifier normally maintains the grid of said gas-filled tube negative with respect to its cathode, a pair of telegraph printers, one associated with each gas-filled tube, the plate circuit of each tube being completed through the selecting magnets of its corresponding printer through a pair of plate rings provided with a rotating brush, a pair of pick-up rings having a rotating brush operating in synchronism with the brushes of said plate rings, and circuit connections between the resistance elements in said output circuit and said pick-up rings for alternately short-circuiting a portion of the resistance elements included in the input circuit of said gas-filled tubes in synchronism with incoming signals.

10. In a signaling system, a signaling circuit, a gaseous conduction tube, means for converting signals of different polarities, received over said circuit, into signals of varying magnitude of current, means for producing discharges through said tube, selectively in accordance with the magnitude of said current, and current responsive means in the output circuit of said tube.

11. In a signaling system, a source of telegraph signals of varying magnitude of current, a gaseous conduction tube, means for producing discharges through said tube selectively, in accordance with the magnitude of said current and current responsive means in the output circuit of said tube.

12. In a telegraph system, a source of telegraph signals comprising positive, negative and zero selecting conditions, a gaseous conduction tube and means responsive to said selecting conditions for controlling the operation of said tube, whereby discharges will be produced therein in accordance with said signal conditions.

13. In a telegraph system, a source of telegraph signals comprising positive, negative and zero selecting conditions, a gaseous conduction tube and means responsive to said selecting conditions for producing a discharge in said tube when signals of one polarity are received, for preventing a discharge from occurring therein when signals of the other polarity are received, and for starting or preventing the occurrence of a discharge therein when signals of zero polarity are received, depending upon the preceding signal conditions.

14. In a telegraph system, a source of telegraph signals, a gaseous conduction tube having a control electrode, means for applying a potential to said control electrode in accordance with said telegraph signals and means for varying said applied potential during a predetermined portion of each signal impulse, whereby to control the starting of a discharge through said tube, and current control means in the output circuit of said tube.

15. In a telegraph system, a source of telegraph signals, a gaseous conduction tube having a control electrode, means for applying a potential to said control electrode in accordance with said telegraph signals and a distributor operating in synchronism with said signals for varying said applied potential during a predetermined portion of each signal impulse, whereby to control the starting of a discharge through said tube, and current control means in the output circuit of said tube.

16. In a telegraph system, a source of signal impulses, a pair of gaseous conduction tubes having starting electrodes, means for applying predetermined potentials to the starting electrodes of both of said tubes in accordance with every signal impulse received and local means for selectively varying the potential applied to one of said tubes, whereby said selective tube only responds to said signal impulse.

17. In a telegraph system, a source of signal impulses, a pair of gaseous conduction tubes having starting electrodes, means for applying predetermined potentials to the starting electrodes of both of said tubes in accordance with every signal impulse received and local means operating in synchronism with said impulses for varying the potential applied to said tubes alternately, whereby said tubes respond alternately to said signal impulses.

18. In a telegraph system, a source of signal impulses, a pair of gaseous conduction tubes having starting electrodes, means for applying predetermined potentials to the starting electrodes of both of said tubes in accordance with every signal impulse received, local means operating in synchronism with said impulses for varying the potential applied to said tubes alternately, whereby said tubes respond alternately to said signal impulses, and a separate recorder in the output circuit of each of said tubes.

19. In a telegraph system, a source of signals of varying magnitudes, a resistance in circuit with said source of signals, a gaseous conduction tube having a cathode and a control electrode connected across said resistance, whereby the drop in potential thereacross due to said signals, applies a predetermined bias to said control electrode and means for periodically shunting at least a portion of said resistance to alter said bias, whereby to control the starting of said tube.

ALBERT W. BREYFOGEL.